(12) United States Patent
Zhang et al.

(10) Patent No.: US 12,508,690 B2
(45) Date of Patent: Dec. 30, 2025

(54) EXTERNAL CLIP-ON FIXTURE

(71) Applicant: BEIJING SOFT ROBOT TECH. CO., LTD., Beijing (CN)

(72) Inventors: Lingfeng Zhang, Suzhou (CN); Xinghao Mou, Suzhou (CN); Yuanrui Zhao, Suzhou (CN); Lei Bao, Suzhou (CN)

(73) Assignee: BEIJING SOFT ROBOT TECH. CO., LTD., Beijing (CN)

( * ) Notice: Subject to any disclaimer, the term of this patent is extended or adjusted under 35 U.S.C. 154(b) by 873 days.

(21) Appl. No.: 17/451,841

(22) Filed: Oct. 22, 2021

(65) Prior Publication Data

US 2022/0040820 A1 Feb. 10, 2022

Related U.S. Application Data

(63) Continuation of application No. PCT/CN2020/084209, filed on Apr. 10, 2020.

(30) Foreign Application Priority Data

Apr. 23, 2019 (CN) .......................... 201910328746.8
Apr. 23, 2019 (CN) .......................... 201920557447.7

(51) Int. Cl.
   *B25B 5/06* (2006.01)
   *B25J 15/00* (2006.01)

(52) U.S. Cl.
   CPC ........... *B25B 5/065* (2013.01); *B25J 15/0023* (2013.01)

(58) Field of Classification Search
   CPC . B25B 5/065; B25J 15/0023; Y10T 24/45775
   (Continued)

(56) References Cited

U.S. PATENT DOCUMENTS 689,590 A * 12/1901 Johnson ................. F16C 13/028
                                                                      492/29
710,327 A *  9/1902 Kling .................... F16C 13/028
                                                                      492/18

(Continued)

FOREIGN PATENT DOCUMENTS

CN        104473681 A        4/2015
CN        104625994 A        5/2015

(Continued)

OTHER PUBLICATIONS

First Office Action in Chinese Application No. 201910328746.8 mailed on Nov. 18, 2023, 17 pages.

(Continued)

*Primary Examiner* — Brian D Keller
*Assistant Examiner* — Jason Khalil Hawkins
(74) *Attorney, Agent, or Firm* — METIS IP LLC

(57) ABSTRACT

The present disclosure provides an external clip-on fixture. The external clip-on fixture may include a support structure (1) and a first elastic member (2). The first elastic member (2) may be configured to sealedly wrap the support structure (1) and expand inward along a radial direction under actions of an inflating and deflating device. The external clip-on fixture of the present disclosure is small in size, light in weight, simple in structure, and low in cost. Fragile and soft objects with different sizes, regular or irregular external shapes, such as a column shape, a bottled shape, etc., may be stably clamped within a certain range without damaging the clamped objects.

15 Claims, 7 Drawing Sheets

(58) Field of Classification Search
USPC ............ 269/22; 24/662, 108, 324; 492/38, 4
See application file for complete search history.

(56) References Cited

U.S. PATENT DOCUMENTS

| | | | | |
|---|---|---|---|---|
| 725,971 | A * | 4/1903 | Kling | F16C 13/028 |
| | | | | 69/13 |
| 751,836 | A * | 2/1904 | Cumback | F16C 13/028 |
| | | | | 492/44 |
| 1,951,998 | A * | 3/1934 | Simonson | B24D 9/02 |
| | | | | 492/38 |
| 1,983,938 | A * | 12/1934 | Humason | E21B 33/06 |
| | | | | 251/1.2 |
| 2,038,140 | A * | 4/1936 | Stone | E21B 33/06 |
| | | | | 285/97 |
| 3,542,354 | A | 11/1970 | Fitzpatrick | |
| 5,372,331 | A * | 12/1994 | Miller | B65H 75/2437 |
| | | | | 242/571.1 |
| 2010/0164187 | A1 | 7/2010 | Geng | |
| 2014/0310937 | A1 | 10/2014 | Kioko | |
| 2014/0338435 | A1 * | 11/2014 | Sakashita | F01N 11/00 |
| | | | | 269/22 |
| 2015/0298320 | A1 | 10/2015 | Eisele et al. | |
| 2020/0001473 | A1 | 1/2020 | Lee | |
| 2020/0061845 | A1 * | 2/2020 | Song | B25J 15/008 |
| 2020/0406426 | A1 | 12/2020 | Bao et al. | |

FOREIGN PATENT DOCUMENTS

| | | |
|---|---|---|
| CN | 205347663 U | 6/2016 |
| CN | 105818074 A | 8/2016 |
| CN | 205674067 U | 11/2016 |
| CN | 206465099 U | 9/2017 |
| CN | 107891419 A | 4/2018 |
| CN | 108501007 A | 9/2018 |
| CN | 207997260 U | 10/2018 |
| CN | 108890682 A | 11/2018 |
| CN | 110076808 A | 8/2019 |
| CN | 211030037 U | 7/2020 |
| DE | 202007000869 01 | 4/2007 |
| DE | 102016000174 A1 | 7/2016 |
| EP | 0218198 A2 | 4/1987 |
| GB | 2357274 A | 6/2001 |
| JP | 2008254904 A | 10/2008 |

OTHER PUBLICATIONS

International Search Report in PCT/CN2020/084209 mailed on Jun. 30, 2020, 9 pages.
Written Opinion in PCT/CN2020/084209 mailed on Jun. 30, 2020, 10 pages.
The Extended European Search Report in European Application No. 20795427.2 mailed on Apr. 21, 2022, 8 pages.

* cited by examiner

EXTERNAL CLIP-ON FIXTURE

CROSS-REFERENCE TO RELATED APPLICATIONS

This application is a Continuation of International Application No. PCT/CN2020/084209, filed on Apr. 10, 2020, which claims priority to Chinese Patent Application No. 201910328746.8, filed on Apr. 23, 2019, and Chinese Patent Application No. 201920557447.7, filed on Apr. 23, 2019, the entire contents of each of which are incorporated herein by reference.

TECHNICAL FIELD

The present disclosure relates to a fixture, and in particular, to an external clip-on fixture.

BACKGROUND

A robotic hand has been widely used in a field of industry, food, military, or the like. A traditional robotic hand has advantages of high work efficiency, precise positioning, or the like. However, due to a rigid structure of the robotic hand, the environmental adaptability of the robotic hand is poor, easily causing scratches and damage specifically to some precision-manufactured components and light industrial products, grasping objects of a single category, and having a great limitation for grabbing a special-shaped object. Although a flexible gripper can complete flexible grabbing without causing scratches, the stability of a workpiece during high-speed transportation cannot be ensured due to structure and material properties, especially for transportation of a vertically distributed and straightly rod-shaped workpiece with a certain weight (e.g., a wine bottle, a steel spindles, etc.).

Therefore, an external clip-on fixture based on an airbag is provided, which may quickly and stably clamp an easily scratched, fragile, or soft object of a cylindrical, bottle-shape, or the like.

SUMMARY

An aspect of the present disclosure provides an external clip-on fixture. The external clip-on fixture may include a support structure and a first elastic member. The first elastic member may be configured to sealedly wrap the support structure, such that the first elastic member expands inward along a radial direction under actions of an inflating and deflating device.

In some embodiments, a reinforcement structure may be arranged on an outer wall and/or an inner wall of the first elastic member; and/or at least one of a wear-resistant layer, an anti-scratch layer, an oil-proof layer, or an antistatic layer may be arranged on the outer wall of the first elastic member. The outer wall of the first elastic member may be in contact with a clamped object when inflated.

In some embodiments, the reinforcement structure may include at least one of a reinforcement rib and a rough surface formed on the first elastic member.

In some embodiments, the reinforcement rib may be at least one of a strip-shaped convex, a wave-shaped convex, and a serrated convex.

In some embodiments, a texture and/or a micro convex point may be arranged on the first elastic member, such that an outer wall surface and/or an inner wall surface of the first elastic member may be formed as the rough surface.

In some embodiments, a material of the first elastic member may be a highly elastic material.

In some embodiments, the highly elastic material may be silicone or rubber.

In some embodiments, an elastic member shape limiting structure may further be arranged on an outer wall of the first elastic member and be configured to change a shape of the first elastic member after expansion.

In some embodiments, a shape of the first elastic member may be the same as a shape of the clamped object in an expansion state.

In some embodiments, a shape of the support structure may include an annular shape, a hollow cylindrical shape, or a hollow prismatic shape.

In some embodiments, a middle portion of the support structure may form a concave shape outwardly along the radial direction, such that an inner cavity may be formed between the first elastic member and an inner side of the support structure.

In some embodiments, a sealing member may be arranged on the support structure. The sealing member may tightly press the first elastic member on the support structure through a fastener to generate an airtightness between the first elastic member and the support structure in a mounting state.

In some embodiments, the support structure may further include a connection structure connected to outside.

In some embodiments, the connection structure may be a threaded connection structure or a clamping connection structure.

In some embodiments, an annular airway may be arranged on an inner wall of the support structure. The first elastic member may expand by inflating gas into the annular airway.

In some embodiments, the support structure may further include a vent hole, and the annular airway may be in communication with the inflating and deflating device through the vent hole.

In some embodiments, a buffer structure may further be included. The support member may be connected to the buffer structure directly or through a connection member.

In some embodiments, the buffer structure may be a buffer, a buffer cushion, a buffer sheet, or a buffer spring; or the buffer structure may include a telescopic member, a pressure sensor, and a controller. The telescopic member and the pressure sensor may be connected to the controller, the support structure may be connected to the telescopic member, and the pressure sensor may be arranged at a connection between the support structure and the telescopic member.

An aspect of the present disclosure provides an external clip-on fixture. The fixture may include the external clip-on fixture as described in any one of the above and an auxiliary inner support. The auxiliary inner support may be arranged on the external clip-on fixture.

In some embodiments, the auxiliary inner support may include a support member and a second elastic member. The second elastic member may be configured to sealedly wrap a portion or all of an outside of the support member, such that a sealed cavity may be formed between the second elastic member and the outside of the support member. In a mounting or an in-use state, the sealed cavity may be in communication with the inflating and deflating device, such that the second elastic member may expand outward along the radial direction and assist the external clip-on fixture to clamp an object to be clamped from inside when the inflating and deflating device inflates gas into the sealed cavity.

In some embodiments, the auxiliary inner support and the external clip-on fixture may be arranged coaxially. The auxiliary inner support may be telescopically movable relative to the external clip-on fixture, such that the auxiliary inner support may clamp the object to be clamped from the inside in the in-use state.

In some embodiments, the auxiliary inner support may further include a telescopic mechanism. The support member may be connected to the telescopic mechanism directly or through a connection member.

In some embodiments, the telescopic mechanism may be a telescopic rod. The support member may be connected to a telescopic end of the telescopic rod directly or through the connection member. Alternatively, the telescopic mechanism may include a spring and a traction member. The support member may be connected to the spring and the traction member directly or through the connection member, such that the support member stretches and retracts along a stretch and a retraction of the spring under a traction of the traction member.

An aspect of the present disclosure provides an external clip-on fixture. The fixture may include the external clip-on fixture as described in any one of the above and a guiding device. The guiding device may be detachably arranged on the external clip-on fixture.

In some embodiments, the guiding device may include a guiding rod and a guiding sleeve. The external clip-on fixture may be connected to the guiding rod, and the guiding sleeve may be sleeved on the guiding rod. A limiting groove may be arranged on the guiding rod along an axial direction. A limiting convex may be arranged in the guiding sleeve. The limiting convex may be clamped in the limiting groove to prevent the guiding rod from rotating in the guiding sleeve, such that the external clip-on fixture may be telescopically movable with the guiding rod along a direction defined by the guiding sleeve in a mounting state.

In some embodiments, an auxiliary inner support may further be included. The auxiliary inner support may be arranged on the external clip-on fixture.

In some embodiments, the auxiliary inner support may further include a telescopic mechanism. The support member may be connected to the telescopic mechanism directly or through a connection member.

An aspect of the present disclosure provides an external clip-on fixture. The fixture may include the external clip-on fixture as described in any one of the above and an auxiliary detachment device. The auxiliary detachment device may be an air jet structure arranged on the external clip-on fixture. The air jet structure may be connected to an inflating and deflating device in an in-use state. Alternatively, the auxiliary detachment device may be a telescopic rod arranged on the external clip-on fixture. Alternatively, the auxiliary detachment device may be a vibration device, and the external clip-on fixture may be arranged on the vibration device.

BRIEF DESCRIPTION OF THE DRAWINGS

The present disclosure is further illustrated in terms of exemplary embodiments. These exemplary embodiments are described in detail with reference to the drawings. The embodiments are not limited. In some embodiments, the same numerals may denote the same structure, wherein.

As shown in the figures, 100 is an external clip-on fixture, 1 is a support structure, 2 is a first elastic member, 11 is a sealing member, 12 is a fastener, 13 is a connection structure, 14 is an annular airway, 15 is a vent hole, 16 is an elastic member shape limiting structure, 3 is an auxiliary inner support, 31 is a support member, 32 is a second elastic member, 33 is a telescopic mechanism, 4 is a guiding device, 41 is a guiding rod, 42 is a guiding sleeve, 43 is a limiting groove, and 44 is a limiting convex.

DETAILED DESCRIPTION

In order to make the objectives, technical solutions, and advantages of the present disclosure to be clearer, the following further illustrates the present disclosure in detail with reference to the accompanying drawings and embodiments. It should be understood that the specific embodiments described herein are only used to explain the present disclosure, which is not used to limit the present disclosure.

On the contrary, the present disclosure covers any alternatives, modifications, equivalent methods, and solutions defined by the claims in the spirit and scope of the present disclosure. In order to enable the public to have a better understanding of the present disclosure, some specific details are described in detail in the following detailed description of the present disclosure. Those skilled in the art may fully understand the present disclosure without the description of the details.

The embodiments of the present disclosure relate to an external clip-on fixture. The external clip-on fixture may clamp an object in a wrapping manner, especially clamp a cylindrical object without a hole, such as a pen, a solid steel pipe, etc. The external clip-on fixture may be applied to various scenarios. For example, the external clip-on fixture may be used in a warehouse, a production line of a factory, etc, that requires batch clamping, which is not limited in the present disclosure.

Figure 1:
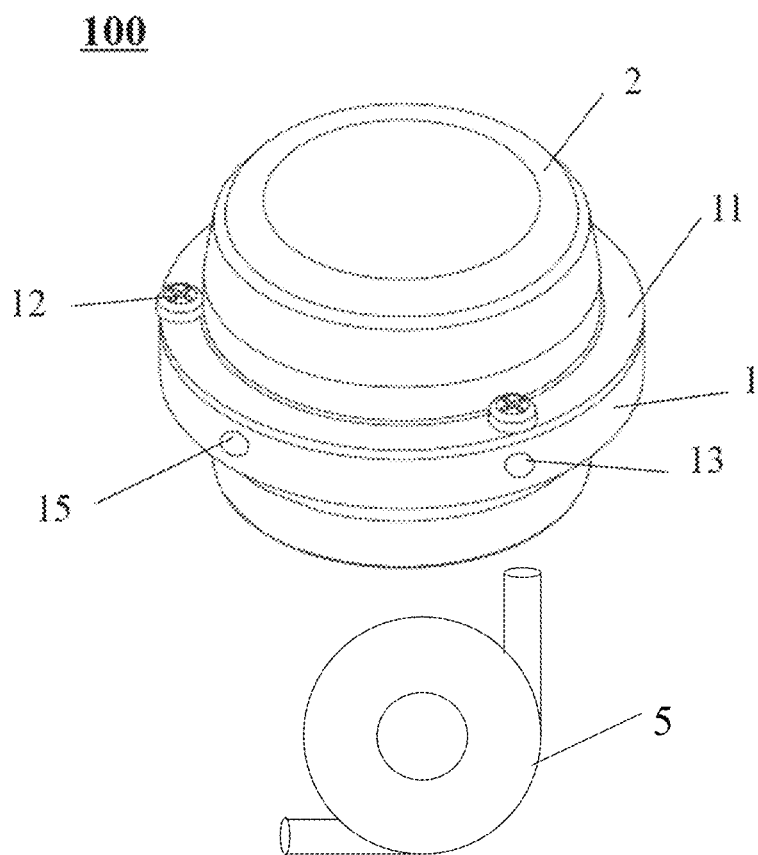
FIG. 1 is a stereogram of an external clip-on fixture according to some embodiments of the present disclosure.
Figure 2:
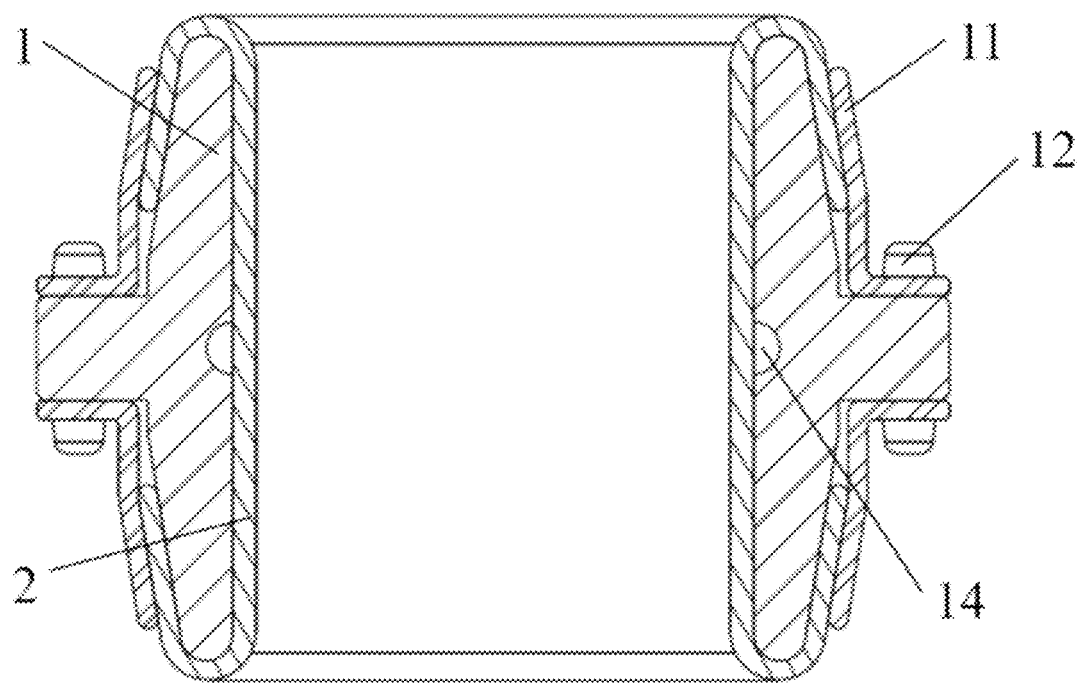
FIG. 2 is a sectional view illustrating a front view of an external clip-on fixture in a mounting state according to some embodiments of the present disclosure.
Figure 3:
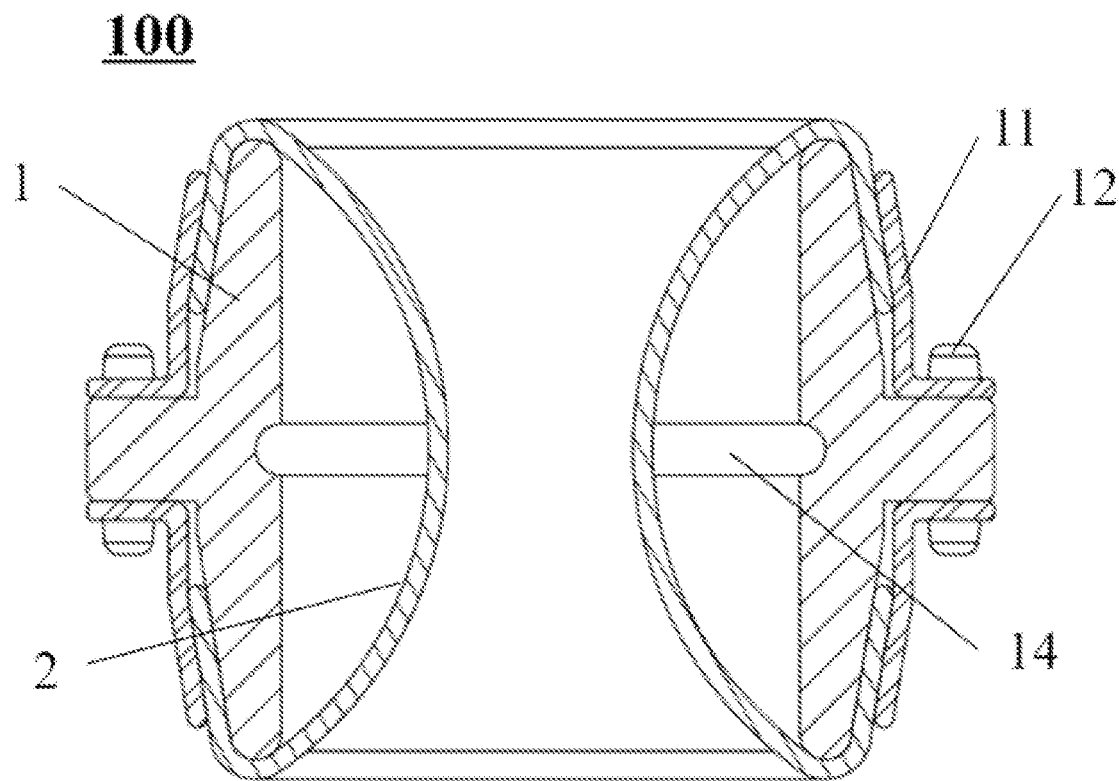
FIG. 3 is a sectional view illustrating a front view of an external clip-on fixture in an expansion state according to some embodiments of the present disclosure.
Figure 4:
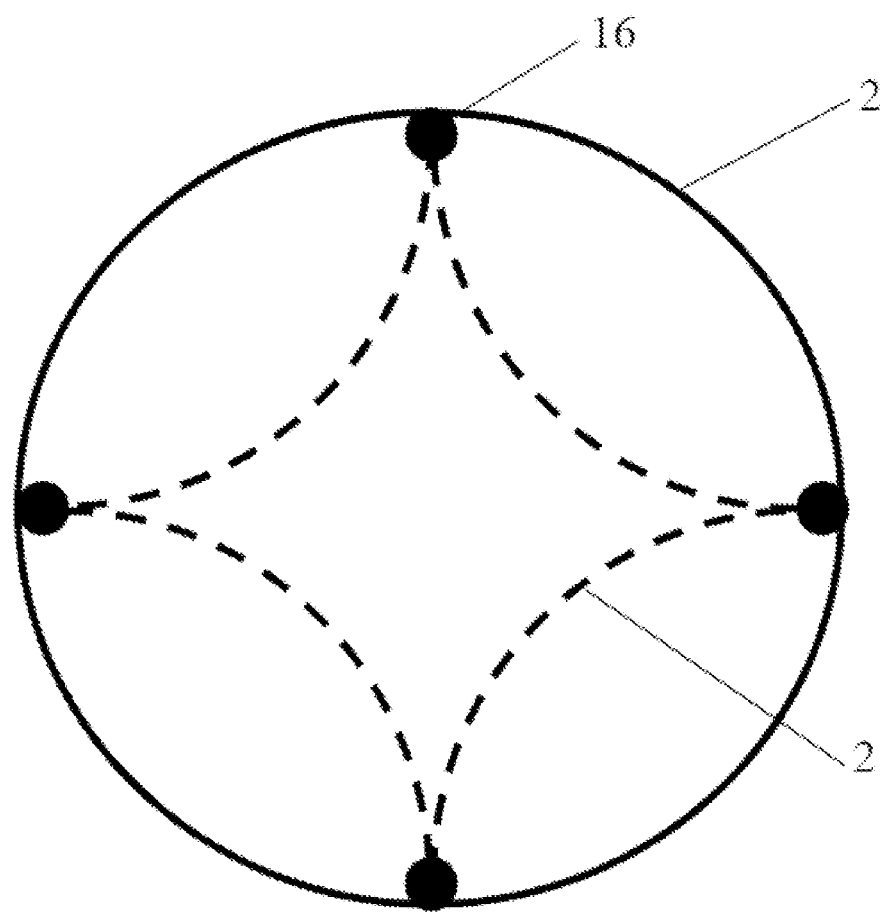
FIG. 4 is a top view of a first elastic member in a mounting state and an expansion state according to some embodiments of the present disclosure.

FIG. 1 is a stereogram of an external clip-on fixture (100) according to some embodiments of the present disclosure. FIG. 2 is a sectional view illustrating a front view of an external clip-on fixture (100) in a mounting state according to some embodiments of the present disclosure. FIG. 3 is a sectional view illustrating a front view of an external clip-on fixture (100) in an expansion state according to some embodiments of the present disclosure. FIG. 4 is a top view of a first elastic member (2) in a mounting state and an expansion state according to some embodiments of the present disclosure. The external clip-on fixture (100) involved in the embodiments of the present disclosure may be described in detail with reference to FIGS. 1-4. It should be noted that the following embodiments are only used to explain the present disclosure, and do not constitute a limitation to the present disclosure.

In some embodiments, as shown in FIGS. 1-3, the external clip-on fixture (100) may include a support structure (1) and a first elastic member (2). The first elastic member (2) may be configured to sealedly wrap the support structure (1), such that the first elastic member (2) expands inward along a radial direction under actions of an inflating and deflating device (5). Specifically, the support structure (1) may be a hollow-shaped support. The first elastic member (2) may wrap a hollow wall of the support structure (1) and be sealedly connected to the support structure (1). The first elastic member (2) may expand inward along the radial direction under the actions of the inflating and deflating device (5).

In some embodiments, a sealing member (11) may be arranged on the support structure (1). The sealing member (11) may tightly press the first elastic member (2) on the support structure (1) through a fastener (12) to ensure an airtightness between the first elastic member (2) and the support structure (1) in a mounting state. In some embodiments, as shown in FIGS. 2-3, the sealing member (11) may be a sealing and compressing block. An inner wall of the sealing and compressing block may be sealedly connected to the first elastic element (2) and an outer wall of the support structure (1). Specifically, the sealing and compressing block may include an upper sealing and compressing block and/or a lower sealing and compressing block. The upper sealing and compressing block may be arranged on an upper portion of an outside of the support structure (1), and the lower sealing and compressing block may be arranged on a lower portion of the outside of the support structure (1). Compared to other sealing members, the installation and disassembly of the sealing and compressing block may be simpler and more convenient, and more suitable for industrial usage. In some embodiments, the fastener (12) may include a bolt-nut assembly, for example, a fastening screw. The sealing and compressing block may be connected to the support structure (1) through the fastening screw, and an inner wall of the sealed and compressing block may be sealedly connected to the first elastic member (2) and the outer wall of the support structure (1). In some alternative embodiments, an upper end and a lower end of the first elastic member (2) may also be configured to sealedly bonded to the support structure (1), such that the first elastic member (2) may be sleeved on the support structure (1) and sealedly wrap all hollow walls of the support structure (1). The first elastic member (2) may be completely wrapped around the hollow wall of the support structure (1). After being inflated (in a positive atmospheric pressure state), a hollow portion of the external clip-on fixture may have a shape of narrowness in the middle and wideness at a top end and a bottom end. As shown in FIG. 4, the first elastic member (2) may be horizontally in contact with an outer side surface of an object to be clamped by 360°. One external clip-on fixture may clamp the object.

In some embodiments, a shape of the support structure (1) may include an annular shape, a hollow cylindrical shape, or a hollow prismatic shape such as a hollow triangular prismatic shape, a hollow quadrangular prismatic shape, a hollow pentagonal prismatic shape, etc. In some alternative embodiments, the shape of the support structure (1) may also be customized according to a shape of the clamped object, which is not limited in the present disclosure. In some embodiments, a middle portion of the hollow wall of the support structure (1) may form a concave shape outwardly along the radial direction, such that an inner cavity may be formed between the first elastic member (2) and an inner side of the support structure (1) in the mounting state. Specifically, the support structure (1) may be in a shape with a large waist and two small ends, that is, the support structure (1) may be in a shape with a diameter gradually decreasing from the middle to the top and the bottom, respectively. The middle portion of the hollow wall of the support structure (1) may have a concave shape outwardly along the radial direction, such that, when the first elastic member (2) is sleeved on the support structure (1) in the manner of wrapping all the hollow walls of the support structure (1), the inner cavity may be formed between the first elastic member (2) and the hollow wall of the support structure (1), such that a structure similar to an airbag may be formed between the first elastic member (2) and the hollow wall of the support structure (1). In addition, when the external clip-on fixture completes clamping the object to be clamped and is desired to detach from the object, the first elastic member (2) of the external clip-on fixture may be unable to detach in time due to electrostatic adsorption or other reasons. By forming the concave shape outwardly along the radial direction in the middle portion of the hollow wall of the support structure (1), the inflating and deflating device may extract all or a portion of the gas between the first elastic member (2) and the hollow wall of the support structure (1), such that the first elastic member (2) may shrink and dent outward along the radial direction, and the first elastic member (2) is detached from the object after completing the clamping.

In some embodiments, the first elastic member (2) may be an elastic member of an eversion cylindrical shape formed in a one-piece integrated manner or formed by an elastic sheet in a crimped manner. In the mounting state or an in-use state, the first elastic member (2) may be in communication with the hollow wall of the support structure (1) and the inflating and deflating device, such that gas may be inflated between the first elastic member (2) and the hollow wall of the support structure (1) to expand the first elastic member (2) inward along the radial direction and deflate the gas to make the first elastic member (2) retract outward along the radial direction. When the first elastic member (2) is in a non-inflating state, the external clip-on fixture of the present disclosure may wrap the object to be clamped from the outside, and inflate gas between the first elastic member (2) and the hollow wall of the support structure (1) through the inflating and deflating device to make the first elastic member (2) expand inward along the radial direction until the first elastic member (2) forms a suitable clamping force on the outside of the object to be clamped and can clamp the object to be clamped from the outside. After the clamping completes, the gas between the first elastic member (2) and the hollow wall of the support structure (1) may be deflated to shrink the first elastic member (2), and the object to be clamped may be detached from the external clip-on fixture of the present disclosure. Since an atmospheric pressure between the first elastic member (2) and the hollow wall of the support structure (1) may be set and adjusted as required, such that the strength of the external clip-on fixture may be adjusted, and a thin-walled or vulnerable workpiece may also be clamped safely.

In some embodiments, the first elastic member (2) may also utilize the airbag directly. Similarly, the airbag may be sealedly wrap all the hollow walls of the support structure (1). In the mounting or the in-use state, the airbag may be in communication with the inflating and deflating device, such that the airbag may be filled with gas to expand inward along the radial direction and deflate the gas to shrink the airbag to clamp the object to be clamped from the outside.

In some embodiments, when the middle portion of the hollow wall of the support structure (1) has the concave shape outwardly along the radial direction, in the mounting state, the waist of the first elastic member (2) may also have a concave shape outwardly along the radial direction. In the case of the same size, the design of the concave shape outwardly along the radial direction may increase a surface area of the first elastic member (2) and further increase a range that the first elastic member (2) may stretch after expansion.

In some embodiments, the material of the first elastic member (2) may be a highly elastic material. An elasticity of the highly elastic material may be excellent. The first elastic member (2) made of the highly elastic material may deform under an atmospheric pressure, and a deformation speed of the first elastic member (2) made of the highly elastic material may be fast, which is suitable for industry application. In some embodiments, the material of the first elastic member (2) may be silica gel, for example, hot vulcanized solid organic silica gel, fluorine silica gel, liquid silica gel, or the like. Silica gel may have excellent properties such as high and low-temperature stability, a wide hardness range (10-80 Shore hardness), chemical resistance, good sealing performance, a good electrical property, compression deformation resistance, etc. Compared with a conventional organic elastomer, silica gel may be particularly easy to be processed and manufactured and be molded, calendered, and extruded with low energy consumption, which has high production efficiency. A tensile strength may refer to a force required to cause a piece of silicone material sample in each range unit to tear. A tensile strength of hot vulcanized solid organic silica gel may be between 4.0-12.5 MPa. A tensile strength of fluorine silica gel may be between 8.7-12.1 MPa. A tensile strength of liquid silica gel may be between 3.6-11.0 MPa. An elongation may refer to an "ultimate rupture elongation" or a percentage increment relative to an original length when a sample ruptures. An elongation of hot vulcanized solid silica gel may be between 90% to 1120% generally. An elongation of fluorine silica gel may be between 159% to 699% generally. An elongation of liquid silica gel may be between 220% to 900% generally. An elongation of a sample may change by selecting different processing methods, hardeners, and temperatures.

By selecting the material of the first elastic member (2) as silica gel, when an outer side surface of the object to be clamped has a complicated contour, since silica gel has a property of generating a great deformation and effectively fits with the outer side surface of the object, it may not be necessary to perform a complicated design on the first elastic member (2) in advance to realize the clamping. It may be understood that the external clip-on fixture based on a highly elastic airbag may be not only suitable for an object to be clamped of a complex outer contour, but also have strong versatility, low production cost, and high efficiency at the same time, which is suitable for usage in an industrial scenario and a life scenario.

In some embodiments, the material of the first elastic member (2) may also be rubber, for example, natural rubber, styrene-butadiene rubber, butadiene rubber, isoprene rubber, etc. In some embodiments, the material of the first elastic member (2) may also be a thermoplastic elastomer or an elastic composite material. For example, the first elastic member (2) may use a styrene-type thermoplastic elastomer (TPE) (e.g., SBS, SEBS, SEPS, EPDM/styrene, BR/styrene, CI-IIR/styrene, NP/styrene, etc.), an olefin-type thermoplastic elastomer (TPE) (e.g., dynamic vulcanization-type TPO), a diene-type thermoplastic elastomer (TPE), etc. As another example, the first elastic member (2) may be made of a POE elastic composite material, etc.

In some embodiments, a reinforcement structure may be arranged on an outer wall and/or an inner wall of the first elastic member (2). The outer wall of the first elastic member (2) may be in contact with the clamped object when inflated. In some embodiments, the reinforcement structure may include a reinforcement rib formed on the first elastic member (2). In some embodiments, the reinforcement rib may be one or more of a strip-shaped convex, a wave-shaped convex, and a serrated convex.

For example, the reinforcement rib may be an annular convex structure formed by protruding inward along a radial direction and extending one circle along a circumferential direction on the outer wall of the first elastic member (2). As another example, the reinforcement rib may be a reinforcement rib structure formed by protruding inward along the radial direction and arranging along an axial direction of the outer wall of the first elastic member (2). In some embodiments, a count of the reinforcement rib may be 1, 2, 3, 4, 5, 6, 7, 8, 9, 10, 11, 12, or more. When the count of the reinforcement rib is multiple, the multiple reinforcement ribs may be uniformly arranged on the outer wall of the first elastic member (2). When the count of the reinforcement rib is multiple, the multiple reinforcement ribs may also be arranged on the outer wall of the first elastic member (2) in different manners as required.

By arranging the reinforcement rib on the outer wall of the first elastic member (2), on one hand, a friction coefficient of a surface of the first elastic member (2) may increase, such that a frictional force with an outer surface of the object to be clamped during usage may increase, and the external clip-on fixture (100) of the present disclosure may clamp the object to be clamped more stably. On the other hand, the reinforcement rib may strengthen the first elastic member (2) and increase a strength, a local rigidity, and a service life of the airbag. In addition, the shape of the first elastic member (2) in the expansion state may also be adjusted by adjusting the count, size, and/or arrangement of the reinforcement rib. For example, when the first elastic member (2) needs to expand inward along the radial direction as a whole, one or more reinforcement ribs may be uniformly arranged on the outer wall of the first elastic member (2). At the same time, the size(s) of the reinforcement rib(s) may be set to be relatively small, such that the first elastic member (2) may expand inward along the radial direction as a whole when inflated. As another example, when a plurality of expansion sections with different lengths and/or different diameters need to form while the first elastic member (2) expands, a plurality of reinforcement ribs may be arranged according to a required interval length, and the sizes of the reinforcement ribs may be set to be relatively large, such that the plurality of expansion sections with different lengths and/or different diameters may be formed while the first elastic member (2) expands. For example, when the first elastic member (2) expands, a structure that a diameter of a lower portion is small and a diameter of the upper portion is large may be formed.

In some embodiments, a reinforcement structure may also be formed on the inner wall of the first elastic member (2). The reinforcement structure formed on the inner wall of the first elastic member (2) may cooperate with the reinforcement structure on the outer wall of the first elastic member (2) to strengthen the first elastic member (2) and increase the strength, local rigidity, and service life of the airbag. In addition, the shape of the first elastic member (2) in the expansion state may also be adjusted.

In some embodiments, the reinforcement structure may also include a rough surface formed on the first elastic member (2). In some embodiments, the rough surface may be formed by textures and/or micro convex points arranged on the first elastic member (2). For example, a plurality of convexes and/or textures of spherical crown shapes may be arranged on the first elastic member (2) in a uniform or non-uniform manner, such that the outer wall surface and/or inner wall surface of the first elastic member (2) may be formed as the rough surface. By arranging the rough surface on the surface of the first elastic member (2), the friction coefficient of the surface of the first elastic member (2) may increase, such that the friction force with the outer surface of the object to be clamped may increase during usage, and the external clip-on fixture (100) of the present disclosure may clamp the object to be clamped more stably.

In some embodiments, a wear-resistant layer, an anti-scratch layer, an oil-proof layer, and/or an antistatic layer may be arranged on the outer wall of the first elastic member (2). The outer wall of the first elastic member (2) may be in contact with the clamped object when inflated. In some embodiments, other materials may be added on the outer wall of the first elastic member (2) (such as adding films of other materials by spraying or immersion), to realize a wear-resistance function, an anti-scratch function, an oil-proof function, an antistatic function, etc. For example, the wear-resistant layer may be formed on the outer wall of the first elastic member (2) by spraying a wear-resistant coating (such as KN17 high molecular ceramic polymer coating, KN7051 silicon carbide ceramic coating, etc.). As another example, the oil-proof layer may be formed by soaking an oil-proof agent (e.g., an organic fluorine compound such as a chromium complex of perfluorinated carboxylic acid, a fluorocarbon acrylate resin, fluorocarbon sulfonamidoethyl acrylate) on the outer wall of the first elastic member (2). As another example, the antistatic layer may be formed on the outer wall of the first elastic member (2) by spraying or soaking an antistatic material (e.g., an antistatic coating such as an antistatic carbon coating, an antistatic metal coating, an antistatic metal oxide coatings, alkyd, acrylic, epoxy, polyurethane). Alternatively, an antistatic film made of a metal oxide-based and a filler-type antistatic material, etc., may be arranged on the outer wall of the first elastic member (2). As another example, the anti-scratch layer may be formed by spraying or immersing an anti-fingerprint coating on the outer wall of the first elastic member (2). Alternatively, an anti-pressure film may be arranged on the outer wall of the first elastic member (2), thereby forming the anti-scratch layer.

In some embodiments, in the expansion state, the shape of the first elastic member (2) may be the same as the shape of the clamped object, such that the surface of the first elastic member (2) may fit the surface of the clamped object better. For example, the outer wall of the first elastic member (2) may be designed to match the surface texture of the clamped object. As another example, the shape of the first elastic member (2) may be customized to be consistent with the shape of the object to be clamped. As another example, an expansion direction of the first elastic member (2) may limit by designing the surface feature or the texture of the first elastic member (2), and the friction force may increase.

In some embodiments, an elastic member shape limiting structure (16) may also be arranged on the outer wall of the first elastic member (2) to change the shape of the first elastic member (2) after expansion. In some embodiments, the elastic member shape limiting structure (16) may be a strip formed integrally with the sealing member (11). The strip may wrap a portion of the outer wall of the first elastic member (2) along the axial direction in the mounting state. In some embodiments, the elastic member shape limiting structure (16) may also be a strip (such as iron wire) arranged singly. Two ends of the strip may be fixedly connected to the sealing member (11) to wrap a portion of the outer wall of the first elastic member (2) along the axial direction. In some embodiments, the elastic member shape limiting structure (16) may be one or more. In some embodiments, as shown in FIG. 4, the solid circular line is a top view of the first elastic member (2) in the non-inflating state, and the four semicircular dashed lines are a top view of the first elastic member (2) in the inflating state under a limitation of four elastic member shape limiting structures (16). The shape of the first elastic element (2) after expansion may be limited by arranging the elastic member shape limiting structures (16) on the outer wall of the first elastic element (2).

In some embodiments, an annular airway (14) may be arranged on the inner wall of the support structure (1), and the first elastic member (2) may expand by inflating gas into the annular airway (14). Specifically, the support structure (1) may also include a vent hole (15), and the annular airway (14) may be in communication with the inflating and deflating device through the vent hole (15). Further, the inside of the support structure (1) may have a main airway and a plurality of sub-airways. The annular airway (14) may be in communication with the main airway through the plurality of sub-airways, and the main airway may be in communication with the inflating and deflating device through the vent hole (15). One port of each sub-airway may be connected to the main airway, and the other port of each sub-airway may be connected to the annular airway (14). The air exchange efficiency inside the airbag may be improved by a plurality of ports of the sub-airways. Gas may be inflated into the vent hole (15) by the inflating and deflating device. The gas may flow from the main airway to the plurality of sub-airways, and finally flow into the annular airway (14), such that the first elastic member (2) may expand inward along the radial direction. The sub-airways and the main airway may be in various forms which are well known to those skilled in the art, which is not be repeated herein.

In some embodiments, the inflating and deflating device may be an electric inflating and deflating device, a circulating inflating and deflating device, a gas pumping and discharging device, a gas generator, a gas storage tank, etc. For example, the air storage tank may be connected to the vent hole (15) through a device or a joint with an inflating and deflating function such as a solenoid valve, etc. As another example, the air generator may be connected to the vent hole (15) through a device or a joint with an inflating and deflating function such as a solenoid valve, etc. The air generator may also be arranged in the first elastic member (2). Through a pneumatic system of the inflating and deflating device (not shown in the figure), an atmospheric pressure state of the first elastic member (2) may be controlled, and an expansion size of the first elastic member (2) may be accurately controlled.

In some embodiments, the support structure (1) may also include a connection structure (13) connected to the outside. In some embodiments, the connection structure (13) may be a threaded connection structure or a clamping connection structure. For example, the support structure (1) may be directly connected to the outside through the threaded connection structure or the clamping connection structure in a threaded connection manner or a clamping connection manner.

In some embodiments, the external clip-on fixture in the embodiments mentioned above may be used alone or in combination. In some embodiments, a plurality of external clip-on fixtures arranged in series may be respectively connected to an external connection member through the connection structure (13). The plurality of external clip-on fixtures may be used as a whole fixture and spliced into a length required in an actual usage scene. The external connection member may include a plurality of connecting portions, and each connecting portion may be respectively connected to the connection structure (13) of each external clip-on fixture (100). The inflating and deflating device may be connected to the vent holes (15) of the plurality of external clip-on fixtures through a gas pipe including a plurality of sub gas routes, so as to inflate gas into the first elastic member (2) to make the first elastic member expand. A count of the sub air routes may be the same as the count of vent holes (15).

In some embodiments, the external clip-on fixture (100) may also include a buffer structure. The support member (1) may be connected to the buffer structure directly or through the connection member. When an external force is exerted on the fixture, the buffer structure may play a buffer function and protect the fixture and the object to be clamped. For example, when the external clip-on fixture is ready to clamp the object to be clamped, the first elastic member (2) may collide with the object to be clamped due to inaccurate positioning. At this time, the buffer structure may play the buffer function to protect the fixture and the object to be clamped. In some embodiments, the buffer structure may be a buffer, a buffer cushion, a buffer sheet, or a buffer spring. The buffer may also be an automatically adjustable buffer. When the first elastic member (2) collides with the object to be clamped and the force exceeds a preset threshold, the buffer may automatically shrink. In some alternative embodiments, the buffer structure may include a telescopic member, a pressure sensor, and a controller. The telescopic member and the pressure sensor may be connected to the controller. The support structure (1) may be connected to the telescopic member. The pressure sensor may be arranged at a connection between the support structure (1) and the telescopic member. In some embodiments, the telescopic member may be an electric telescopic rod, a hydraulic telescopic rod, a pneumatic telescopic rod, etc. When the first elastic member (2) collides with the object to be clamped and the force exceeds the preset threshold, a telescopic mechanism may automatically retract.

In some cases (such as batch clamping), if the external clip-on fixture does not accurately wrap the outside of the object to be clamped, the object may be damaged. By arranging the buffer structure (such as a spring, or other reasonable structures such as a telescopic rod, etc.), the external clip-on fixture may be passively retracted and be retracted when touching the object, thereby reducing the possible damage to the object. In addition, when objects are clamped in batches (such as clamping objects in a matrix manner), an object guide may not enter occasionally. For example, if there are 60 spare parts, 59 spare parts may be able to make the fixture wrap the objects, but 1 may fail. In this case, the 59 wrapped spare parts may be taken away without damaging the unwrapped spare part through the buffer structure. In addition, the first elastic member (2) may also be protected by arranging the buffer structure. Specifically, when the first elastic member (2) extends to the object to be clamped and if the positioning is incorrect or the wrapping is too much, a relatively large resistance may be applied on the first elastic member (2). If the resistance is not buffered, the resistance may form a destructive force, and the friction of the first elastic member (2) may increase, causing damage to the first elastic member (2).

Figure 5:
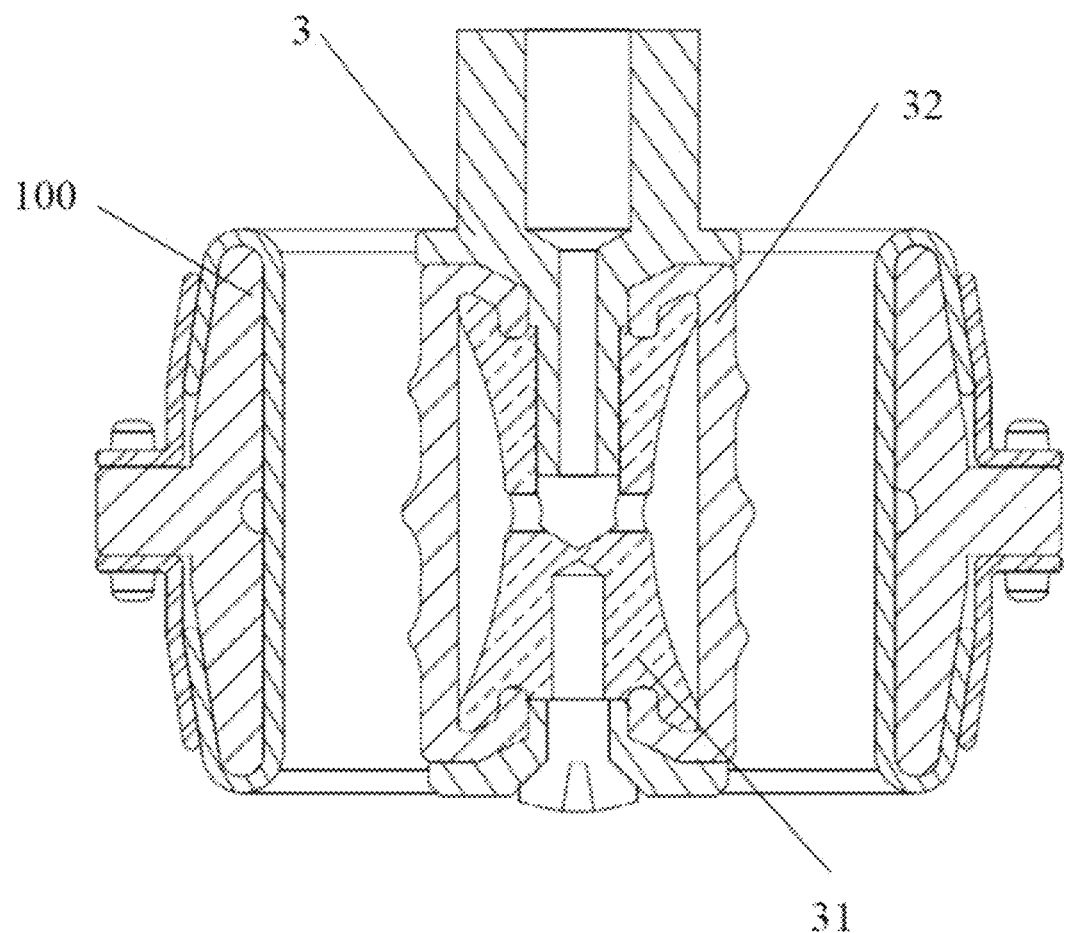
FIG. 5 is a diagram illustrating a structure of an external clip-on fixture with an auxiliary inner support according to some embodiments of the present disclosure.

FIG. 5 is a diagram illustrating a structure of an external clip-on fixture (100) with an auxiliary inner support according to some embodiments of the present disclosure. In the embodiments shown in FIG. 5, the auxiliary inner support (3) may be arranged on the external clip-on fixture (100). The auxiliary inner support (3) may include a support member (31) and a second elastic member (32). The second elastic member (32) may be sealedly wrap a portion or all of the outside of the support member (31), such that a sealed cavity may be formed between the second elastic member (32) and the outside of the support member (31). In a mounting or an in-use state, the sealed cavity may be connected to an inflating and deflating device, such that the second elastic member (32) may expand outward along a radial direction to assist the external clip-on fixture (100) to clamp an object to be clamped from the inside when the inflating and deflating device inflates gas into the sealed cavity. In some embodiments, a material and a structure of the second elastic member (32) may be the same as the first elastic member (2), which is not repeated here.

In some embodiments, the auxiliary inner support (3) and the external clip-on fixture (100) may be arranged coaxially. The auxiliary inner support (3) may be telescopically movable relative to the external clip-on fixture (100), such that the auxiliary inner support (3) may clamp the object to be clamped from the inside in the in-use state. Specifically, in the in-use state, the first elastic member (2) may be located outside the object to be clamped. The second elastic member (32) may extend in the object to be clamped. Air may be inflated into a sealed cavity formed between the first elastic member (2) and a hollow wall of the support structure (1) and a sealed cavity between the second elastic member (32) and the outside of the support member (31) through the inflating and deflating device. The first elastic member (2) may expand inward along the radial direction to fit with an outer wall of the object to be clamped and clamp the object to be clamped from the outside. The second elastic member (32) may expand outward to fit with an inner wall of the object to be clamped and clamp the object to be clamped from the inside, thereby completing the clamping and grasping of the object to be clamped.

By arranging the auxiliary inner support (3), the object to be clamped may be clamped from the inside and outside simultaneously, even if one fails or slips off, the other may also complete the clamping. In addition, by clamping the object to be clamped from the inside and outside simultaneously, a clamping force distribution may be more uniform, and the damage to the object to be clamped caused by an excessive local force may be reduced. In addition, the clamping of an object in a particular scenario may be achieved by arranging the auxiliary inner support (3), for example, an object that is difficult to be clamped directly by an external clip-on fixture. In this case, the object may be slightly lifted by the auxiliary inner support (3), and then be clamped using the external clip-on fixture (100). For example, densely stacked bottled objects are not suitable to be directly clamped by an external fixture since there is no enough space. An internal support fixture is not suitable for high-speed transportation. Through the combination of the auxiliary inner support (3) and the external clip-on fixture (100), the auxiliary inner support (3) may extend into the object to be clamped firstly, and lift the object to a certain height, then the external clip-on fixture (100) may clamp the object for the transportation.

Figure 6:
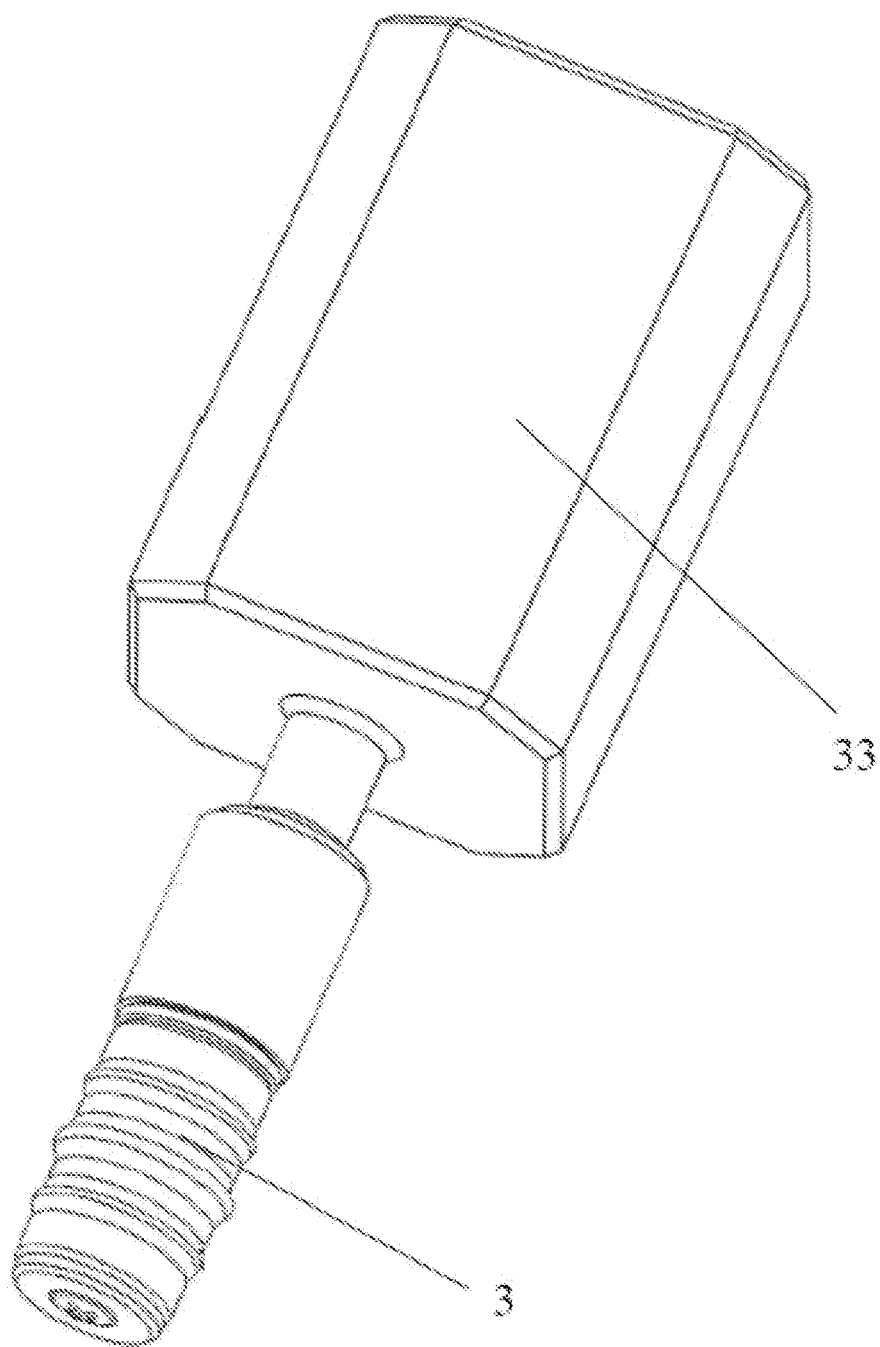
FIG. 6 is a diagram illustrating a structure of an auxiliary inner support with a telescopic mechanism according to some embodiments of the present disclosure.

FIG. 6 is a diagram illustrating a structure of the auxiliary inner support (3) with a telescopic mechanism according to some embodiments of the present disclosure. In some embodiments, as shown in FIG. 6, the auxiliary inner support (3) may also include a telescopic mechanism (33). The support member (31) may be connected to the telescopic mechanism (33) directly or through a connection member, such that the second elastic member (32) may be movable with a stretch and a retraction of the telescopic mechanism (33). Specifically, the telescopic mechanism (33) may be a telescopic rod (e.g., an electric telescopic rod, a hydraulic telescopic rod, a pneumatic telescopic rod, etc.). The support member (31) may be connected to a telescopic end of the telescopic rod through a threaded connection structure, such that the second elastic member (32) may be movable with the stretch and the retraction of the telescopic mechanism (33).

In some embodiments, the telescopic mechanism (33) may include a spring and a traction member (e.g., a traction wire, a traction rope, a traction rod, etc.). The support member (31) may be connected to the spring and the traction member directly or through a connection member. The traction member may drive the support member (31) to move up and down, such that the support member (31) may stretch or retract with a stretch and a retraction of the spring under a traction of the traction member.

The clamping of an object in a particular scenario may be achieved by arranging the auxiliary inner support (3) in a telescopic manner. For example, when objects to be clamped are densely stacked and a portion of the objects are lower than a height of a surrounding object (e.g., densely stacked bottled objects), the objects are not suitable to be directly clamped from outside by an external fixture since there is no enough space. Since heights of objects in a middle portion may be relatively low, the objects in the middle portion cannot be clamped through an inner support fixture for batch clamping. However, the auxiliary inner support (3) may stretch and retract by arranging the telescopic mechanism (33), thereby completing batch clamping of the densely stacked objects under the circumstance mentioned above.

Figure 7:
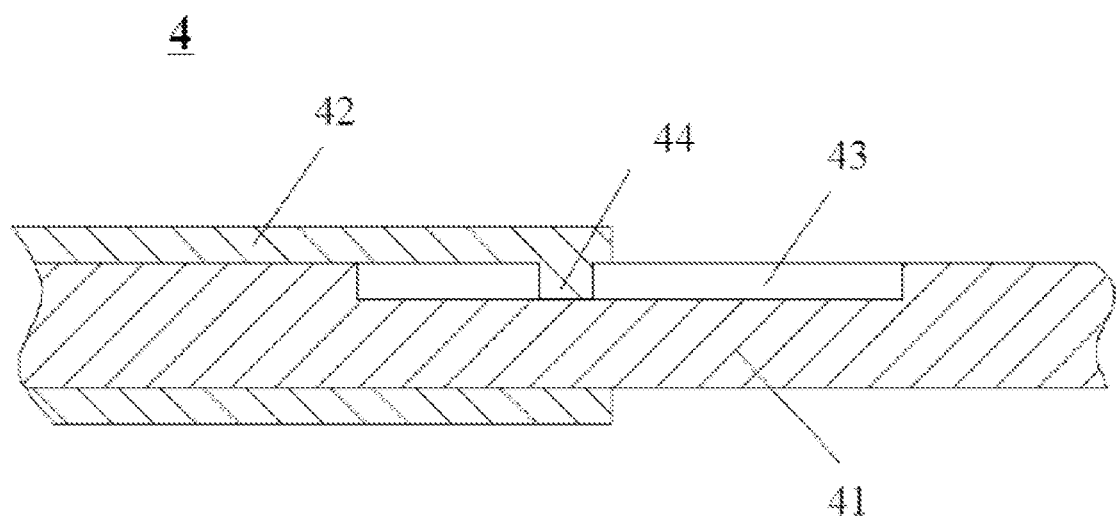
FIG. 7 is a diagram illustrating a structure of an external clip-on fixture with a guiding device according to some embodiments of the present disclosure.

FIG. 7 is a diagram illustrating a structure of a guiding device (4) according to some embodiments of the present disclosure.

In some embodiments, the external clip-on fixture (100) may also include a guiding device (4) detachably arranged on the external clip-on fixture (100). In some embodiments, as shown in FIG. 7, the guiding device (4) may include a guiding rod (41) and a guiding sleeve (42). The external clip-on fixture (100) may be connected to the guiding rod (41), such that the first elastic member (2) may be movable with a stretch and a retraction of the guiding rod (41). The guiding sleeve (42) may be sleeved on the guiding rod (41), such that the guiding rod (41) may be telescopically movable along a direction defined by the guiding sleeve (42). A limiting groove (43) may be arranged on the guiding rod (41) along an axial direction. A limiting convex (44) may be arranged inside the guiding sleeve (42). In a mounting state, the limiting convex (44) may be clamped in the limiting groove (43) to prevent the guiding rod (41) from rotating in the guiding sleeve (42), and the external clip-on fixture (100) may be telescopically movable with the guiding rod (41) along the direction defined by the guiding sleeve (42).

It should be noted that the structure of the guiding device described above is only exemplary, and different guiding devices may be used for different objects in practical applications.

In some embodiments, the external clip-on fixture (100) mentioned above may also include the auxiliary inner support (3) arranged on the external clip-on fixture (100). The descriptions of the auxiliary inner support (3) are similar to those described in FIG. 5, which is not repeated here.

In some embodiments, the auxiliary inner support (3) may also include the telescopic mechanism (33). The auxiliary inner support (3) may be connected to the telescopic mechanism (33) directly or through a connection member. The descriptions of the telescopic mechanism (33) are similar to those described in FIG. 6, which is not repeated here.

In some embodiments, the external clip-on fixture (100) may also include an auxiliary detachment device. When the external clip-on fixture is desired to detach from the object, the external clip-on fixture may be unable to detach in time due to electrostatic adsorption or other reasons. By arranging the auxiliary detachment device in the hollow portion of the external clip-on fixture, the auxiliary detachment device may be used to assist the object to detach when the object needs to detach.

In some embodiments, the auxiliary detachment device may be an air jet structure arranged on the external clip-on fixture (100). The air jet structure may be connected to the inflating and deflating device in the in-use state. For example, the air jet structure may be an air jet nozzle arranged at a center axis of the hollow portion of the external clip-on fixture (100). The air jet nozzle may be connected to the inflating and deflating device in the mounting state and the in-use state. Specifically, the air jet structure may be a nozzle with an annular structure, and the nozzle may have air jet holes distributed in an annular shape. The nozzle may be fixedly connected to the external clip-on fixture (100), and the nozzle with the annular structure and the external clip-on fixture (100) may be arranged coaxially in the mounting state, such that the air jet holes distributed in the annular shape may be evenly distributed along the axial direction of the hollow portion of the support member (1) and face the object to be clamped. When the object is sucked up, the airbag shrinks, and if the object does not fall off, air may be blown to a middle position and/or a side position by the air jet nozzle to disturb the object, making the object fall off. As another example, the air jet structure may be an airway formed on the outer wall of the first elastic member (2). The airway may be connected to the inflating and deflating device in the in-use state. When the object is sucked up, the airbag may shrink, but the object does not fall off, gas may be blown downward or upward along with the first elastic member (2) through the airway, making the object fall off. By arranging the air jet structure on the external clip-on fixture, when the object is necessary to detach, gas may be blown to a suction portion of the object and the fixture by the air jet structure, thereby assisting the detachment of the object.

In some alternative embodiments, the auxiliary detachment device may be a telescopic rod arranged on the external clip-on fixture (100). For example, the telescopic rod may be a pneumatic telescopic rod arranged on the external clip-on fixture (100) or formed as an integrated structure with the external clip-on fixture (100). When the object is sucked up, the airbag shrinks, but the object does not fall off, the telescopic rod may stretch to touch the object and make the object fall off.

In some alternative embodiments, the auxiliary detachment device may be a vibration device. The external clip-on fixture (100) may be arranged on the vibration device. For example, a micro-vibration device may be installed on the external clip-on fixture (100). When the object is sucked up, the airbag shrinks, but the object does not fall off, the external clip-on fixture (100) may be vibrated or shaken by the micro-vibration device, making the object fall off. For example, the vibration device may be a mobile phone vibrator in a mobile phone or a similar mechanism or device.

The possible beneficial effects of the external clip-on fixture disclosed in the present disclosure may include but be not limited to:

The external clip-on fixture of the present disclosure may be small in size, light in weight, simple in structure, low in cost, and due to the soft nature of the silicone airbag, objects with different sizes and similar shapes may be clamped within a certain range without causing damage to the clamped objects. A fragile and soft object with a cylindrical shape, a bottled shape, etc., may be clamped quickly and stably without damaging the surface of the object. After the external clip-on fixture with the first elastic member of the present disclosure wraps the outside of the object, the first elastic member may expand to fit with the inner surface of the object, thereby clamping the object to be clamped from the outside. Further, the first elastic member may have the same shape as the object to be clamped without generating a local stress concentration, which is not easy to damage the inner surface of the object. Further, the atmospheric pressure inside the airbag may be adjustable, that is, the force strength of the external fixture may be adjustable. A thin-walled or a vulnerable workpiece may also be clamped safely. Further, even if the pneumatic system is overloaded, or the positioning is incorrect to cause the collision, the object may not be damaged. Further, when the outer side surface of the object to be clamped has a complex contour, since silica gel may have a property of generating a great deformation, an effective attachment and the clamping may be achieved without performing a complicated design in advance. It should be noted that different embodiments may have different beneficial effects. In different embodiments, the possible beneficial effects may be any one or a combination of the above, or any other beneficial effects that may be obtained.

The descriptions mentioned above are only preferred embodiments of the present disclosure, which are not intended to limit the present disclosure. Any modifications, equivalent replacement, and improvement made within the spirit and principle of the present disclosure should be included in the scope of the present disclosure.

What is claimed is:

1. A fixture, comprising:
an external clip-on fixture; and
an auxiliary inner support arranged on the external clip-on fixture; wherein
the external clip-on fixture includes:
a support structure;
a first elastic member, wherein the first elastic member is configured to sealedly wrap the support structure such that the first elastic member expands inward along a radial direction under actions of an inflating and deflating device;
a sealing member being arranged on the support structure and tightly presses the first elastic member on the support structure through a fastener to ensure an air-tightness between the first elastic member and the support structure in a mounting state; and
an elastic member shape limiting structure being arranged on an outer wall of the first elastic member and being configured to change a shape of the first elastic member after expansion; wherein the elastic member shape limiting structure is a strip formed integrally with the sealing member, and the strip wraps a portion of the outer wall of the first elastic member along an axial direction in the mounting state:
the auxiliary inner support includes a support member and a second elastic member;
the second elastic member is configured to sealedly wrap a portion or all of an outside of the support member, such that a sealed cavity is formed between the second elastic member and the outside of the support member; and
in a mounting or an in-use state, the sealed cavity is in communication with the inflating and deflating device, such that the second elastic member expands outward along the radial direction and assists the external clip-on fixture to clamp an object to be clamped from inside when the inflating and deflating device inflates gas into the sealed cavity;
the external clip-on fixture surrounds the auxiliary inner support; wherein the first elastic member is located outside the object to be clamped, the second elastic member extends in the object to be clamped; the first elastic member expands inward along the radial direction to fit with an outer wall of the object to be clamped and clamp the object to be clamped from the outside, the second elastic member expands outward to fit with an inner wall of the object to be clamped and clamp the object to be clamped from the inside.

2. The fixture of claim 1, wherein
the auxillary inner support and the external clip-on fixture are arranged coaxially; and
the auxiliary inner support is telescopically movable relative to the external clip-on fixture, such that the auxiliary inner support clamps the object to be clamped from the inside in the in-use state.

3. A fixture, comprising:
the external clip-on fixture according to claim 1; and
a guiding device detachably arranged on the external clip-on fixture.

4. The fixture of claim 3, wherein
the guiding device includes a guiding rod and a guiding sleeve;
the external clip-on fixture is connected to the guiding rod;
the guiding sleeve is sleeved on the guiding rod;
a limiting groove is arranged on the guiding rod along an axial direction;
a limiting convex is arranged inside the guiding sleeve; and
the limiting convex is clamped in the limiting groove to prevent the guiding rod from rotating in the guiding sleeve, such that the external clip-on fixture is telescopically movable with the guiding rod along a direction defined by the guiding sleeve in a mounting state.

5. The fixture of claim 1, wherein the auxiliary inner support and the external clip-on fixture are arranged coaxially.

6. The fixture of claim 1, wherein
a reinforcement structure is arranged on the outer wall or an inner wall of the first elastic member; or
at least one of a wear-resistant layer, an anti-scratch layer, an oil-proof layer, or an antistatic layer is arranged on the outer wall of the first elastic member, wherein the outer wall of the first elastic member is in contact with a clamped object when inflated.

7. The fixture of claim 6, wherein the reinforcement structure includes at least one of a reinforcement rib or a friction surface formed on the first elastic member.

8. The fixture of claim 7, wherein a texture or a micro convex point is arranged on the first elastic member such that an outer wall surface or an inner wall surface of the first elastic member is formed as the friction surface.

9. The fixture of claim 1, wherein a material of the first elastic member is a highly elastic material.

10. The fixture of claim 1, wherein the shape of the first elastic member is the same as a shape of a clamped object in an expansion state.

11. The fixture of claim 1, wherein a middle portion of the support structure forms a concave shape outwardly along the radial direction, such that an inner cavity is formed between the first elastic member and an inner side of the support structure.

12. The fixture of claim 1, wherein the support structure further includes a connection structure connected to outside.

13. The fixture of claim 1, wherein an annular airway is arranged on an inner wall of the support structure, and the first elastic member expands by inflating gas into the annular airway.

14. The fixture of claim 1, wherein
the support structure further includes a vent hole, and
an annular airway is in communication with the inflating and deflating device through the vent hole.

15. The fixture of claim 1, further comprising a buffer structure, the support structure being connected to the buffer structure directly or through a connection member, wherein
the buffer structure is a buffer, a buffer cushion, a buffer sheet, or a buffer spring; or
the buffer structure includes a telescopic member, a pressure sensor, and a controller, wherein the telescopic member and the pressure sensor are connected to the controller, the support structure is connected to the telescopic member, and the pressure sensor is arranged at a connection between the support structure and the telescopic member.

* * * * *